US009279578B2

(12) United States Patent
Bertin

(10) Patent No.: US 9,279,578 B2
(45) Date of Patent: Mar. 8, 2016

(54) SURFACE MOUNTING LAMP

(71) Applicant: CALZONI S.r.l., Calderara di Reno (Bologna) (IT)

(72) Inventor: Daniele Maria Bertin, Milan (IT)

(73) Assignee: CALZONI S.r.l. (IT)

(*) Notice: Subject to any disclaimer, the term of this patent is extended or adjusted under 35 U.S.C. 154(b) by 60 days.

(21) Appl. No.: 14/048,760

(22) Filed: Oct. 8, 2013

(65) Prior Publication Data
US 2014/0111993 A1     Apr. 24, 2014

(30) Foreign Application Priority Data

Oct. 19, 2012   (IT) .............................. BO2012A0572

(51) Int. Cl.
| *F21S 4/00* | (2006.01) |
| *F21V 21/00* | (2006.01) |
| *F21V 31/00* | (2006.01) |
| *F21V 3/00* | (2015.01) |
| *F21S 8/00* | (2006.01) |
| *F21V 17/10* | (2006.01) |
| *B63B 45/06* | (2006.01) |
| *B64F 1/20* | (2006.01) |
| *F21V 17/12* | (2006.01) |
| *F21W 111/06* | (2006.01) |
| *F21Y 101/02* | (2006.01) |
| *F21Y 103/00* | (2006.01) |
| *F21Y 105/00* | (2006.01) |

(52) U.S. Cl.
CPC ............... *F21V 31/005* (2013.01); *B63B 45/06* (2013.01); *F21S 8/032* (2013.01); *F21V 3/00* (2013.01); *F21V 17/101* (2013.01); *B64F 1/20* (2013.01); *F21V 17/12* (2013.01); *F21W 2111/06* (2013.01); *F21Y 2101/02* (2013.01); *F21Y 2103/003* (2013.01); *F21Y 2105/001* (2013.01)

(58) Field of Classification Search
CPC ...... F21V 17/101; F21V 31/005; B63B 45/04; B63B 45/06
USPC ................................................... 362/477, 545
See application file for complete search history.

(56) References Cited

U.S. PATENT DOCUMENTS

2011/0280014 A1* 11/2011 Householder et al. ........ 362/235
2012/0188766 A1*  7/2012 Lu et al. .................... 362/249.02

FOREIGN PATENT DOCUMENTS

| EP | 2322849 | 5/2011 |
| FR | 2690468 | 10/1993 |
| FR | 2697617 | 5/1994 |
| WO | 2011/097425 | 8/2011 |

OTHER PUBLICATIONS

Italian Search Report from counterpart application No. BO20120572.

* cited by examiner

*Primary Examiner* — Evan Dzierzynski
*Assistant Examiner* — Zachary J Snyder
(74) *Attorney, Agent, or Firm* — Timothy J. Klima; Shuttleworth & Ingersoll, PLC

(57) ABSTRACT

A surface mounting lamp includes a covering element of a transparent material and having a first face, which in use is directed outwards away from a mounting surface of the lamp, and a second face opposite the first face and provided with at least one socket for housing lighting elements. A lighting unit is sealably connected to the covering element, facing the inside of the socket and includes a plurality of lighting elements, each housed in the socket. The lamp also includes a junction piece connected to the covering element and having a connecting portion engageable with the mounting surface of the lamp to fix the position thereof, and a retaining mechanism interposed between the junction piece and the second face of the covering element and connecting the covering element to the junction piece.

17 Claims, 8 Drawing Sheets

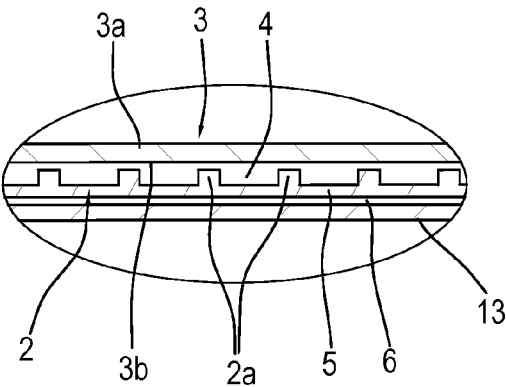
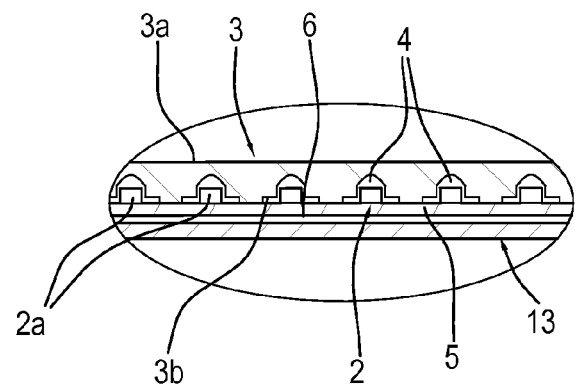
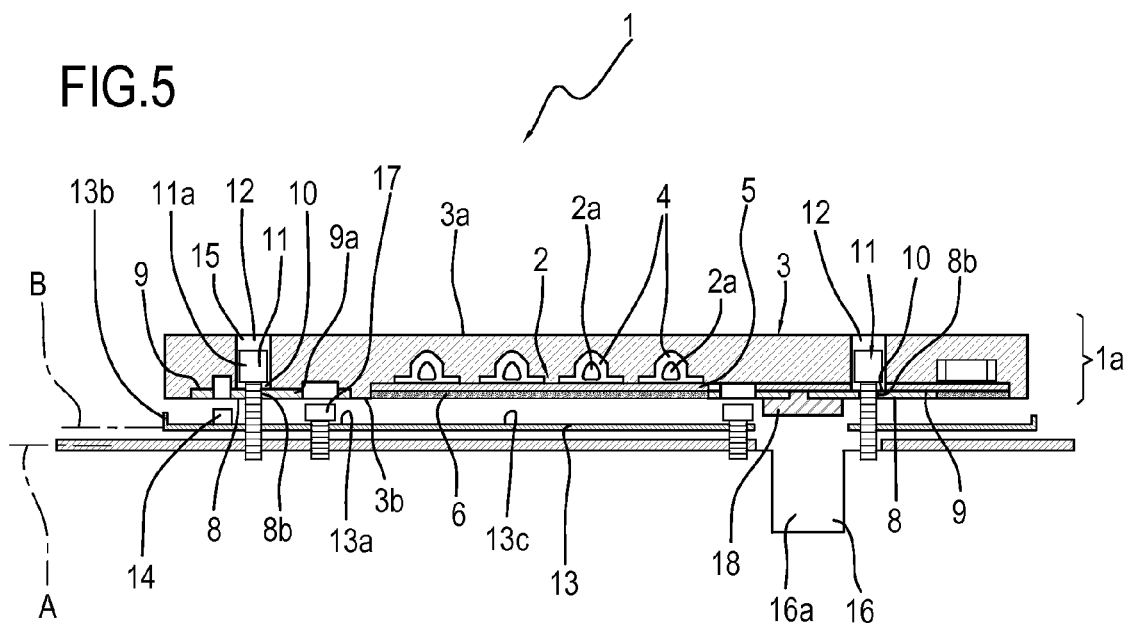

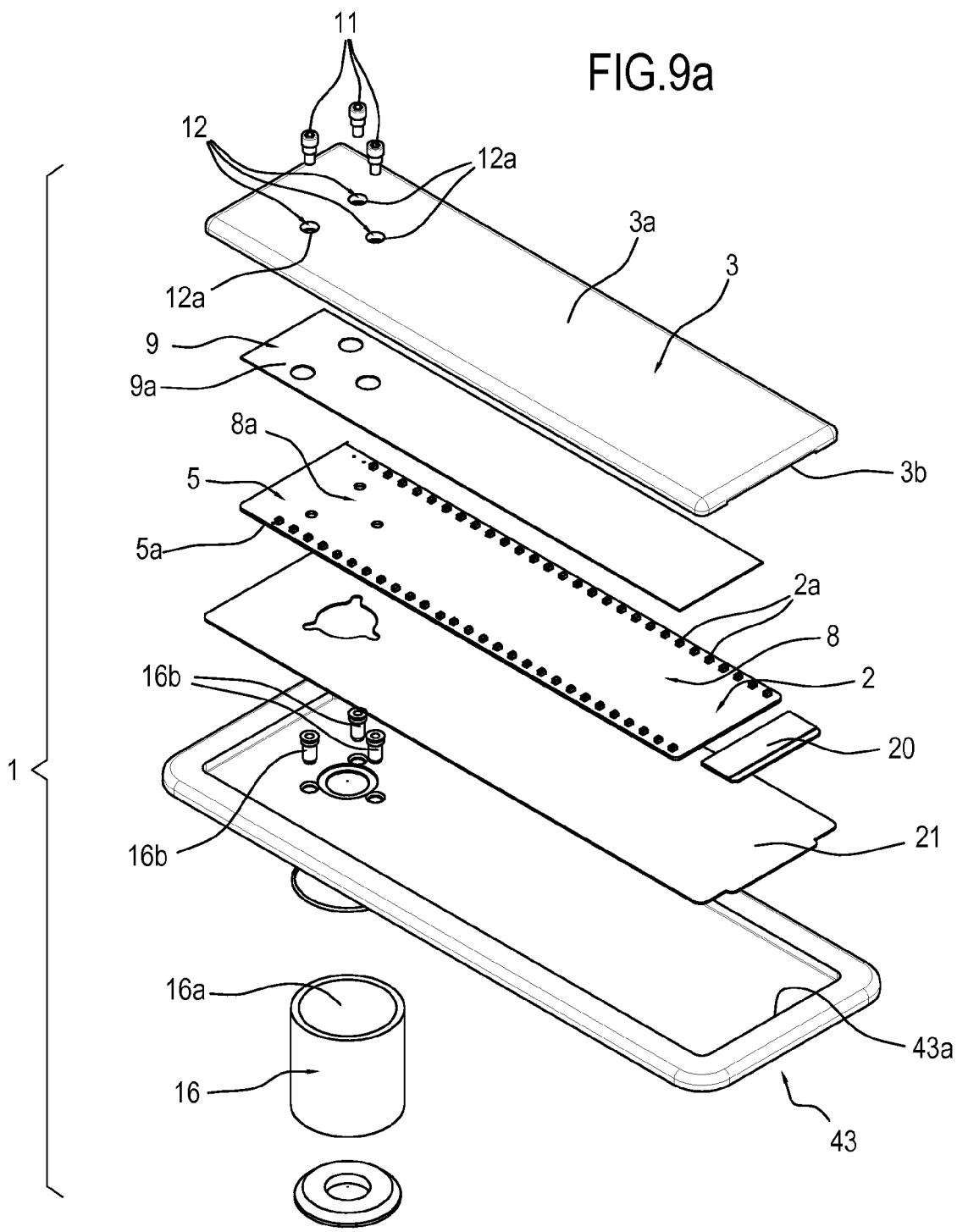

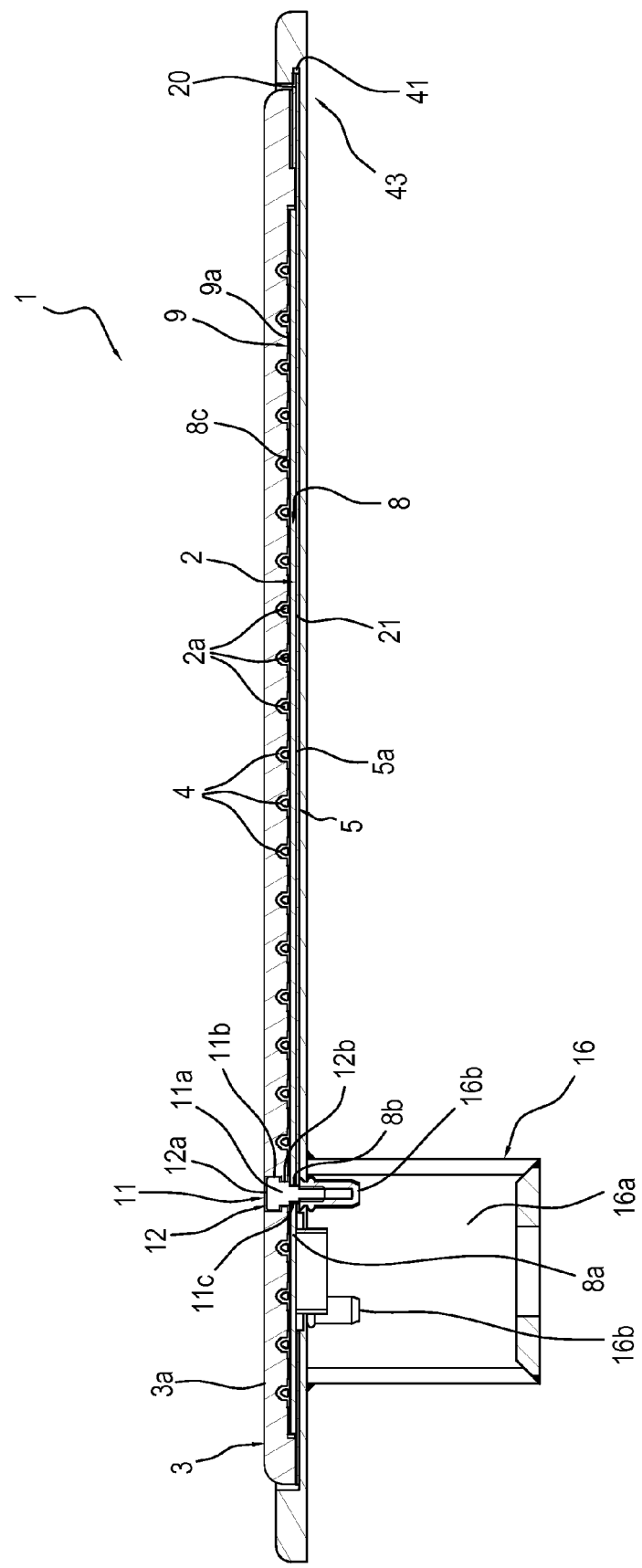

SURFACE MOUNTING LAMP

This application claims priority to Italian Patent Application BO2012A000572 filed Oct. 19, 2012, the entirety of which is incorporated by reference herein.

BACKGROUND OF THE INVENTION

This invention relates to a surface mounting lamp, that is, a lamp configured to be installed flush with a supporting surface.

The invention is applicable in particular in the field of aviation, particularly for lighting landing decks or helipads on both land and offshore platforms and on board ships.

In effect, these lamps are installed on a flat surface in such a way as to protrude just a little from the surface in order to provide a delimited illuminated indication along the surface which may be defined either by covered ground (tarmac or paving) or by slabs and metal frames (on board ships).

Current solutions for installation on the ground and even on landing decks involve making an opening in the lamp mounting (or installation) surface, where the lamp can be recessed and fixed in place.

In other words, a hole is made in the ground or ship deck to allow the body of the lamp to be recessed therein.

In some cases, it is also necessary to provide a sealed receptacle comprising within it the entire lighting element and the water passages and forming also a fire safety barrier.

Thus, prior art surface mounting lamps, especially when they require large emitting surfaces for purposes of visibility as mentioned above (for example, an illuminated line) involve making large openings in the mounting surface which in turn means not only high installation costs but also a significant impact on the structural continuity of the support.

Typically, current lamps are made with a metal or plastic profile (or flange) running all the way round the lamp body and screwed in such a way as to hold the transparent cover.

Disadvantageously, that means the covers have to be particularly thick because they have to resist the high stress transmitted to them by the flange.

Moreover, the flange constitutes an opaque element round the lamp which prevents side lighting along the ground unless the lamp is raised relative to the flange, making the lamp even more protrusive.

SUMMARY OF THE INVENTION

The aim of this invention is to provide a surface mounting lamp that overcomes the above mentioned disadvantages of the prior art.

More specifically, it is an aim of this invention to provide a surface mounting lamp that is particularly slim and at the same time robust.

Another aim of the invention is to provide a surface mounting lamp that can provide side lighting along the surface the lamp is mounted on.

Yet another aim of the invention is to provide a surface mounting lamp that is easy to make and quick to install.

These aims are fully achieved by the surface mounting lamp according to the invention, comprising a covering element made of a transparent material (preferably PMMA) and having a first face which, in use, is directed outwards away from a mounting surface of the lamp, and a second face which is opposite the first face and which is provided with at least one socket for housing one or more lighting elements and at least one lighting unit (printed circuit) sealably connected to the covering element and facing the inside of the socket, where the circuit is equipped with a plurality of lighting elements, each housed in the socket.

The lamp of the invention also comprises at least one junction piece connected to the covering element and equipped with a connecting portion which can be engaged with the mounting surface of the lamp in order to fix the position thereof, and retaining means interposed between the junction piece and the second face of the covering element and operating in such a way as to connect the covering element to the junction piece.

In other words, a pulling constraint is created between the junction piece and the covering element, (that is to say, a constraint which pulls the two parts together) to prevent them from coming apart.

Preferably, the retaining means are of a chemical type, that is, defined by a layer of adhesive material (for example, epoxy glue) or sealing material so as not to subject the structure of the covering element to mechanical stress.

In effect, the mechanical constraint is defined by the tightening means (screws or bolts) which operate between the junction piece and the lamp mounting surface in such a way as not to act on the covering element.

Advantageously, the lamp is thus particularly slim and robust.

BRIEF DESCRIPTION OF THE DRAWINGS

These and other features of the invention will become more apparent from the following detailed description of a preferred, non-limiting embodiment of it, with reference to the accompanying drawings, in which:

FIGS. 3 and 3a show, respectively, a sectional view and a detail of the lamp of FIG. 2 in a first embodiment of the covering element;

FIGS. 4 and 4a show, respectively, a sectional view and a detail of the lamp of FIG. 2 in a second embodiment of the covering element;

FIG. 5 is a schematic view of the surface mounting lamp according to this invention;

FIGS. 9, 9a and 9b are a perspective view, an exploded view and a sectional view of an embodiment of a lamp according to the invention.

DESCRIPTION OF THE PREFERRED EMBODIMENTS

Figure 1:
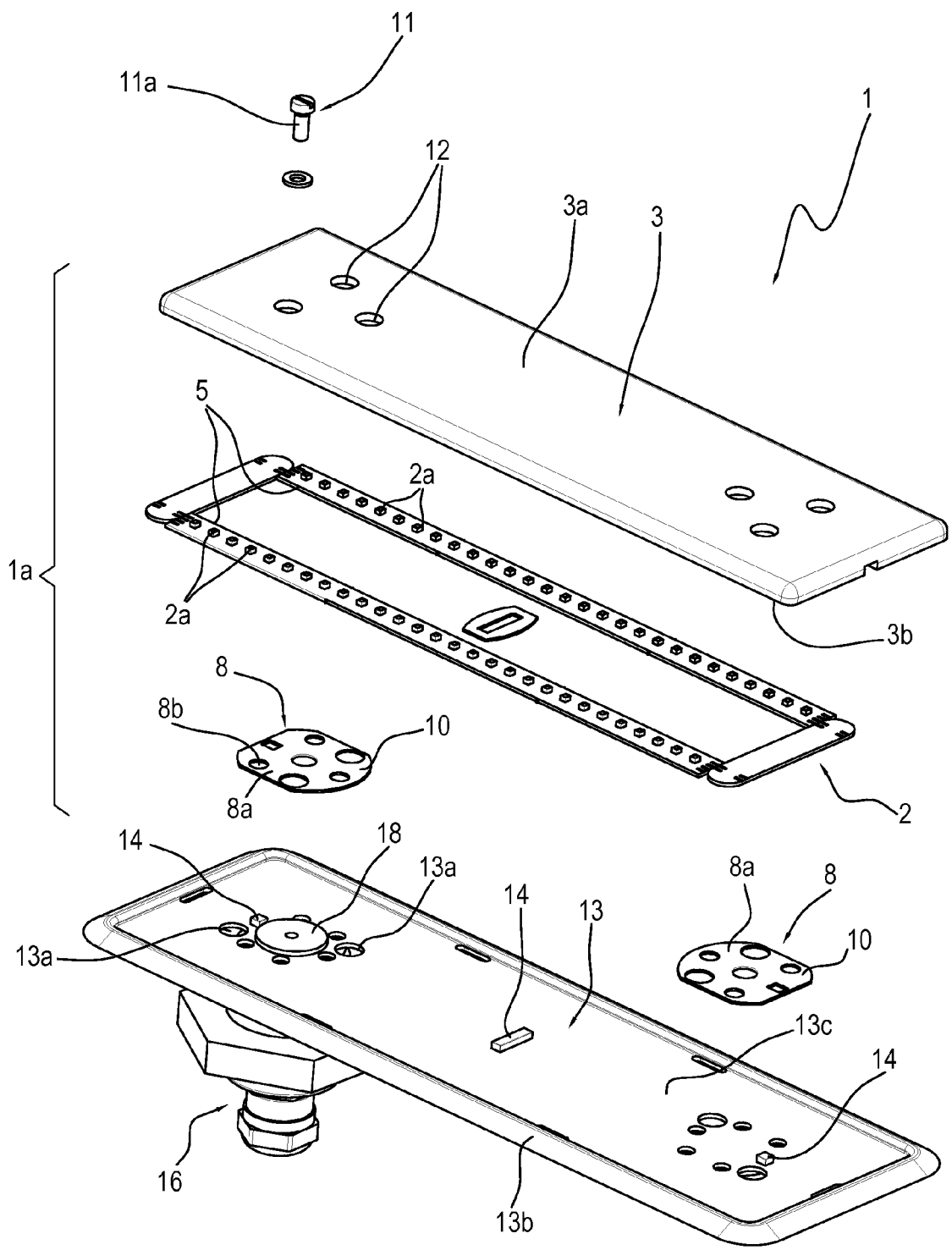
FIG. 1 is an exploded view of the lamp according to this invention.
Figure 2:
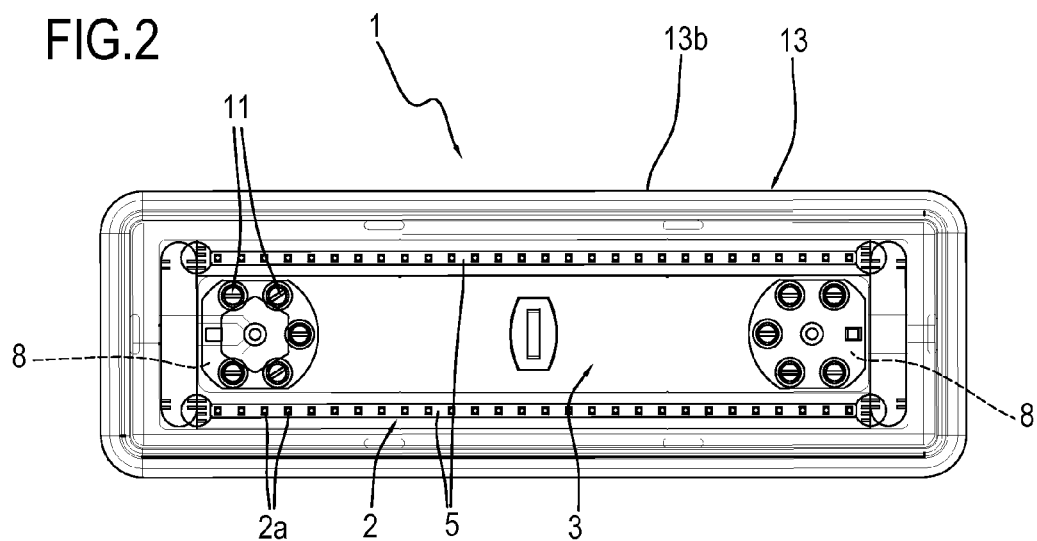
FIG. 2 is a plan view of the lamp of FIG. 1.

With reference to the accompanying drawings, the numeral 1 denotes a surface mounting lamp according to this invention.

The term "surface mounting lamp" is used to mean a slim lamp adapted to be installed on a mounting surface "A", preferably flat, be it the ground (airport or heliport) or the deck of a ship.

As mentioned above, the purpose of the lamp 1 is to define an illuminated line along the mounting surface "A" to delimit an aircraft landing or take-off area and path.

This, in use, the lamp 1 lies on the ground and is directed upwards in such a way as to provide a reference point on the ground (or ship's deck).

Thus, an important feature of the lamp 1 is that it must be able to support structures driven over it and hence must be resistant to high compression loads.

The lamp 1 comprises a lighting unit 2 and a covering element 3 made of a transparent material, preferably a poly (methyl methacrylate) (abbreviated PMMA) or of polycarbonate.

Poly(methyl methacrylate) is a plastic material composed of polymers of methyl methacrylate, the ester of methacrylic acid.

Chemically, it is the polymer of methyl methacrylate. It is also known by the trade names of Acrivill®, Deglas®, Limacryl®, Lucite® Oroglas®, Perclax®, Perspex®, Plexiglas®, Resartglass®, Vitroflex® and Trespex®.

Preferably, the covering element 3 has a principally planar extension, that is to say, it presents two main directions where the extension of the element 3 is markedly greater than a third principal direction Thus, the covering element 3 is substantially a cap which may be flat or curved, depending on applications.

The covering element 3 has a first face 3$a$, which in use is directed outwards away from a mounting surface "A" of the lamp 1, and a second face 3$b$, opposite the first face 3$a$.

The second face 3$b$ is provided with at least one socket 4 for housing at least part of the lighting unit 2, and more specifically, for housing a plurality of lighting elements 2$a$ (better described below) forming part thereof.

The socket 4 thus defines a chamber for housing one or more lighting elements 2$a$ of the lamp 1.

The lighting elements 2$a$ are preferably of a substantially punctiform type.

In the embodiment illustrated, the lighting elements 2$a$ are LEDs (light emitting diodes) in their various forms, providing concentrated punctiform light or mounted on surface elements (COB, OLEDs or the like).

Alternatively, however, the lighting elements might also be of another type such as, for example, electroluminescent panels (not illustrated). The lighting elements might also be optical modules (not illustrated) which diffuse light carried by optical fibres.

Preferably, moreover, the lighting unit 2 comprises a (printed) circuit 5 on which the lighting elements 2$a$ are installed.

The circuit 5 is of the printed board type and comprises the electronic circuitry, including balancing resistors and/or electrical protection devices.

Preferably, moreover, the circuit 5 comprises a connector (not illustrated) for electrical connection.

Thus, the lighting unit 2 is substantially a planar shaped element (for example a board) equipped with a plurality of lighting elements 2$a$ arranged in a more or less regular manner along the surface of the circuit 5.

In the embodiment illustrated, for example, the light elements 2$a$ (LEDs) are arranged in two rows along the edges of the circuit 5 (and of the lamp 1). Alternatively, however, the arrangement of the lighting elements 2$a$ might be different, but without thereby departing from the spirit of the invention.

It should be noted that the LEDs may be installed either with main axis at a right angle to the mounting surface "A" (and thus to the plane defined by the circuit 5), or with axis parallel to the surface, in such a way as to improve the distribution of the sidelight.

In a first embodiment, the covering element 3 is provided with one or more sockets 4, each adapted to house two or more lighting elements 2$a$.

Thus, the covering element 3 is a substantially full element made in such a way as to define a plurality of sockets 4 or grooves in which the lighting elements 2$a$ of the lighting unit 2 are housed.

Advantageously, that way, the thickness of the lamp 1 is limited because the lighting elements 2$a$ do not add their thickness to that of the covering element 3 but are embedded in the latter and housed in the sockets 4.

Figure 3:
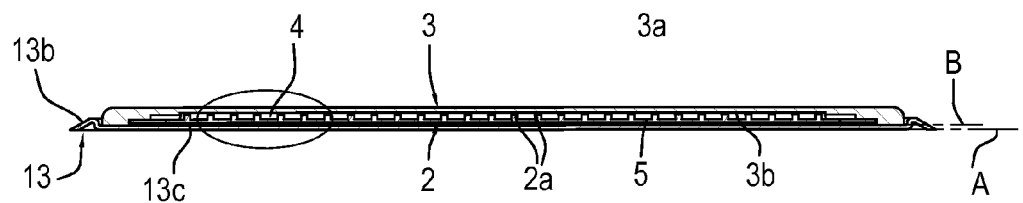

With reference to FIGS. 3 and 3$a$, the covering element 3 presents a pair of sockets 4, or grooves of a size such as to accommodate all the lighting elements 2$a$ under a single vault.

In this embodiment, the lighting unit 2 comprises two printed circuits which are electrically connected to each other to define a single body and each housed in a respective socket 4.

In a second embodiment, each socket 4 is adapted to house a single lighting element 2$a$.

Figure 4:
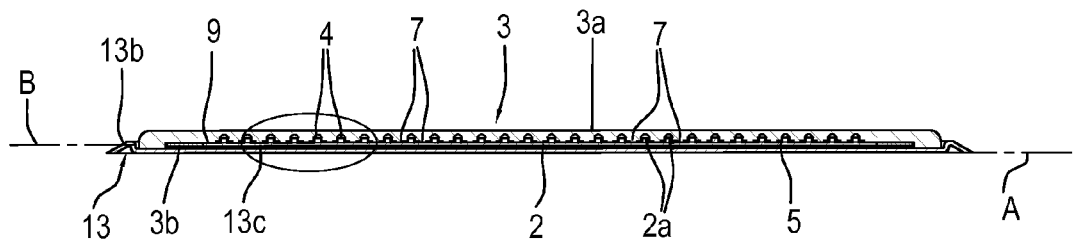
Figure 6:
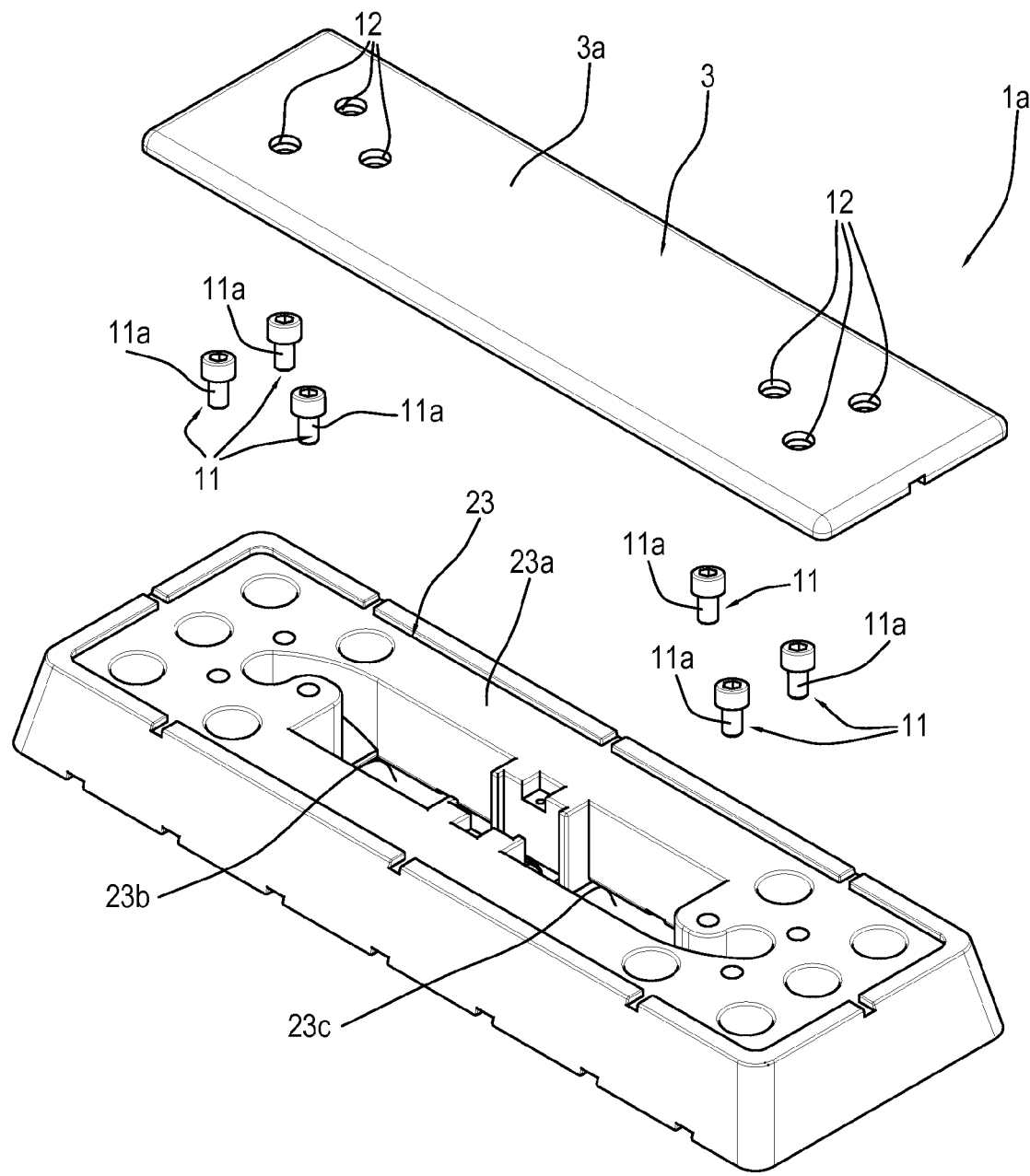
FIG. 6 is an exploded view of the lamp according to this invention in a first alternative embodiment of it.
Figure 7:
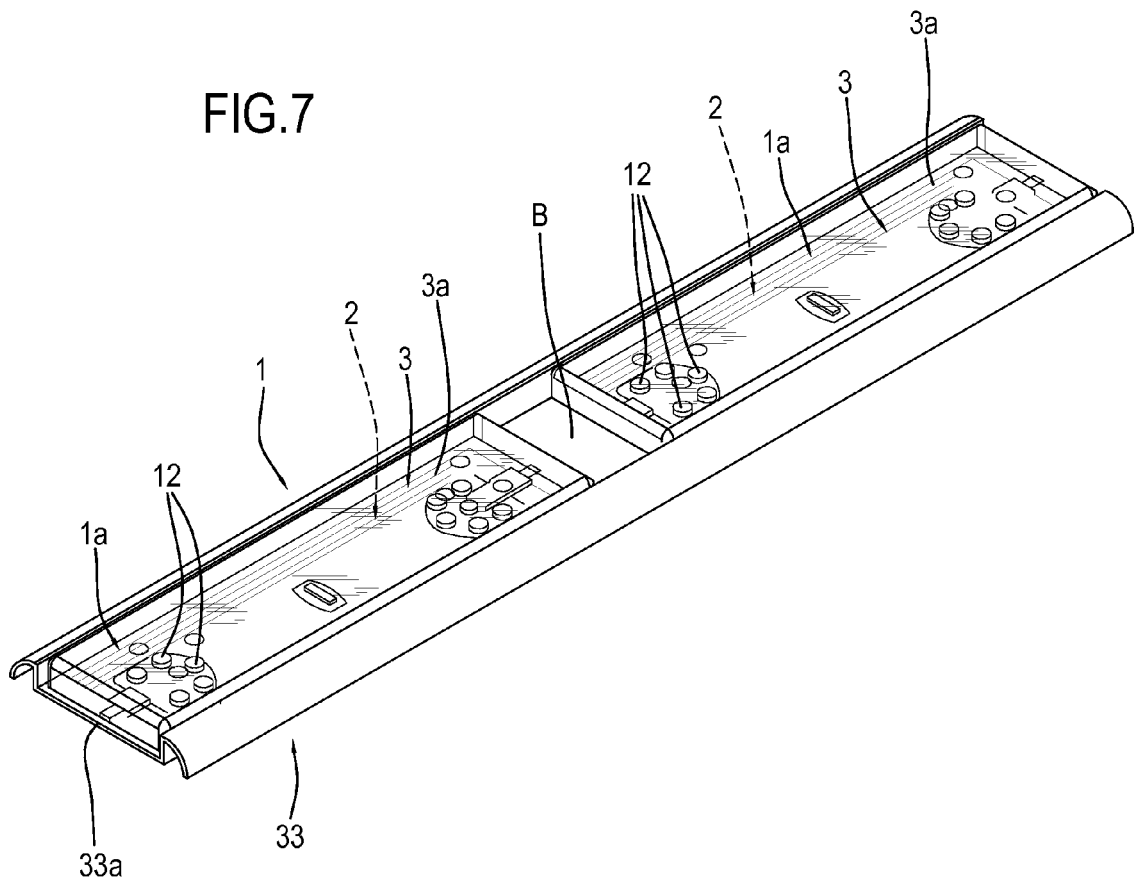
FIG. 7 is a perspective view of the lamp according to this invention in a second alternative embodiment of it.
Figure 8:
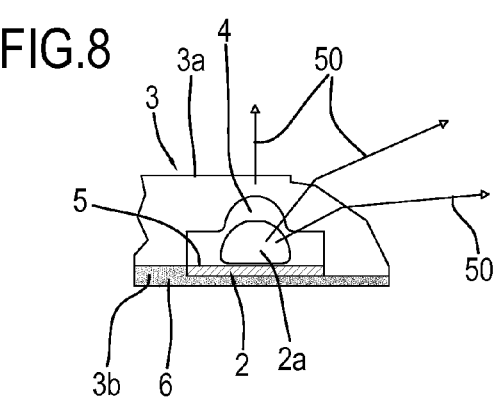
FIG. 8 is a sectional view of a detail of the lamp according to the invention in order to highlight its lighting features.

With reference to FIGS. 4 and 4$a$, the covering element 3 presents a plurality of sockets 4 each being of a size such as to accommodate a single lighting element.

Thus, the covering element 3 is provided with a series of sockets arranged to mirror the lighting elements.

In the embodiment illustrated, each socket is larger in volume than the respective lighting element 2$a$.

Thus, there is an air volume between the lighting element 2$a$ and the intrados of the socket 4.

Alternatively, however, each socket 4 might be exactly shaped to match the respective lighting element 2$a$.

In this embodiment, therefore, each lighting element 2$a$ is recessed in the respective socket 4 and remains in contact with the intrados thereof.

Thus, the covering element 3 and the lighting unit 2 substantially define a single block, without empty spaces.

This configuration is obtained preferably by incorporating the lighting unit 2 in the covering element during the moulding thereof.

It is clear, therefore, that the covering element 3 is not suspended over the circuits 5 and lighting elements 2$a$, but is supported at numerous points 7 which oppose its bending even when the lamp 1, installed in the ground, is subjected to high compression loads (for example, under the weight of a vehicle/aircraft).

Thus, the shape and combination of the covering element 3 with the lighting unit 2 gives high compressive strength to the lamp 1.

Preferably, the surface of each socket 4 and of the first face 3$a$ of the covering element 3 has a curvature such as to direct the light rays 50 from the lighting elements 2$a$ according to a desired light distribution characteristic which may also include emitting light tangentially to the mounting surface "A" of the lamp 1.

The directing of the light rays is obtained by the effect of refraction on the two surfaces concerned. The first, air-to-material, is the surface of the socket 4. The second, material-to-air, is the outside surface 3$a$. This curvature is obtained using a machine tool process (for example, on CNC routers). Alternatively, the part may be moulded.

In other words, the sockets 4 of the covering element 3 are optical surfaces which can be used to distribute light intensity at the different emission angles.

The inside surface of the sockets 4 can also be treated with a layer of reflective material in order to reflect the light rays.

In this case, directing the light rays from the light source is accomplished by a sequence of reflection into the socket 4 and two effects of refraction out of the socket 4 and out of the outside surface 3a.

The lighting unit 2 is tightly sealed. More specifically, the lighting unit is connected to the covering element in such a way that it is tightly sealed.

Thus, the lighting unit 2 is sealably connected, that is, sealed, to the covering element 3.

That means the covering element 3 serves both as a transparent cover and as a receptacle.

More precisely, the circuit 5 is sealed to the second face 3b of the covering element 3 by a layer of sealing material 6 spread on an exposed side 5d of the circuit 5

The term "exposed" means the side which is directed towards the outside of the covering element 3

Advantageously, this is an easy and effective way of guaranteeing that the lamp 1 is watertight without leaving to the installer the task of sealing it by correctly placing gaskets and tightening screws.

The aforementioned sealing material is preferably of a fluid type—for example, a resin—which adapts to the shape of and covers all the passages to the outside and, once dry, changes to a solid, elastic state.

In a preferred embodiment, the layer of sealing material is made from the same material as the covering element 3 itself, namely, poly(methyl methacrylate), PMMA.

In other words, the layer of sealing material is made from the same material as the covering element 3 which, once dry, is a single part comprising the printed circuit 5.

That means the covering element 3, made of PMMA, also comprises the bottom sealing layer.

Thus, the circuit 5 (with the LEDs) is embedded in the covering element 3.

In this embodiment, the sockets 4 are shaped to match the lighting element 2a.

Thus, as already mentioned, the covering element 3 and the lighting unit 2 substantially define a single block, without empty spaces.

During production, both the circuit 5 and the lighting elements 2a are embedded in the moulding of the transparent covering element 3.

In this embodiment, the covering element 3 adheres completely to the circuit 5 and therefore does not, in this case, have an air volume inside the sockets 4.

To connect the covering element 3 (and the lighting unit) to the mounting surface "A", the lamp 1 comprises at least one junction piece 8 connected to the covering element 3 and equipped with a connecting portion 8a which can be engaged with the mounting surface "A" of the lamp 1 in order to fix the position thereof.

The lamp 1 may comprise a single junction piece 8 or more than one junction piece, depending on the size of the lamp and on how many connecting points are needed to keep it securely fixed.

In the embodiment illustrated in FIGS. 1 to 8, the junction piece 8 is in the form of a plate. More precisely, the lamp 1 comprises two junction plates 8, rounded in shape, that is to say, two discs placed in a substantially symmetrical manner along the centre line of the covering element 3.

Preferably, the plate 8 is substantially flat and is connected solely to the second face 3b of the covering element 3.

In other words, in use, the plate 8 is located under the covering element 3.

Thus, the first face 3a of the covering element 3 is substantially free.

That means the whole surface of the first face 3a of the covering element 3 may be considered as "working surface".

Moreover, that means the lateral surface of the covering element 3 also remains free, which allows light to be emitted in a direction parallel to the mounting surface "A" (that is, horizontally) without lateral obstructions, and yet the plate 8 (or support) is very easy to make.

Each plate 8 may be made from a metallic or plastic material or from a polymer, preferably metallic.

It should be noted that the covering element 3 has a plurality of slots which are shaped to match the junction plate 8 (or plates 8) and the circuit 5 in order to facilitate its positioning.

In other words, the covering element 3 comprises spaces made both for the circuit 5 (with the LEDs) and for the system (plates 8) of fastening the cover to the base.

To connect the plate (or plates) 8 to the covering element 3, the lamp 1 comprises retaining means 9 interposed between the selfsame plate 8 (or plates 8) and the second face 3b of the covering element 3.

The retaining means 9 operate on the second face 3b in such a way as to connect the covering element 3 to the plate 8.

In other words, the retaining means 9 are of the "pulling" type, that is to say, they apply a pulling action on the second face 3b (that is, the "underside") of the covering element 3.

Thus, the retaining means 9 do not act in any way on the first face as of the covering element 3.

Advantageously, that way, the forces which hold the lamp 1 to the mounting surface "A" act solely on the plate 8 and not on the covering element 3, which remains integral with the plate 8 solely through the agency of the retaining means.

This configuration prevents strong local tensional stress from being created on the covering element. Advantageously, this increases the strength of the lamp 1.

Preferably the retaining means 9 are defined by a layer of adhesive material 9a interposed between the plate 8 and the second face 3b of the covering element 3.

The adhesive material is preferably an epoxy glue or the like.

Advantageously, that means there are no mechanical fastening elements between the plate 8 and the covering element 3 which in turn means that tension between the two parts is reduced.

Moreover, the connection between covering element 3 and plate 8 is partly elastic, which makes it possible to control and absorb at least part of the tension without stressing the two parts (covering element 3 and plate 8).

it should be noted that the covering element 3 integrated with the lighting unit and with the junction plates 8 defines a single lighting element 1a of the lamp 1.

Preferably, the connecting portion 8a of the plate 8 comprises at least one abutment web 10 which is engageable with a fastening member 11 to anchor the lamp 1 to the mounting surface "A".

In the simpler embodiment, the fastening member 11 is a screw 11a or a nut whose shoulder acts compressively on the abutment web 10 to hold the plate 8 (and hence the lamp 1) to the mounting surface "A".

in the preferred embodiment, the covering element 3 has a plurality of through holes 12 in it, each shaped to receive a fastening member 11.

Thus, each through hole 12 is substantially cylindrical in shape, to enable insertion and sliding of the screw 11a.

Further, the connecting portion 8a of the plate 8 is provided with a plurality of openings 8b, each facing (preferably aligned with) one of the through holes 12.

The openings 8*b* have a smaller extension for area) than the through hole 12 they face, thus defining the abutment web 10 of the plate 8.

In other words, the through hole 12 and the abutment web 10 define a housing 15 for the head of the screw 11*a* or for the nut of the bolt (depending on the embodiment of the fastening members 11) whilst the opening 8*b* defines a gap for the passage of the screw thread.

That way, the shoulder of each fastening member 11 can be fastened against the abutment web 10 of the plate 8.

Preferably, the height of the housing 15 (corresponding to the depth of the through hole or the thickness of the covering element 3) is greater than an abutment portion of the fastening member 11 housed therein (head of the screw 11*a* or nut).

Advantageously, that way, the fastening members 11 are hidden and embedded within the covering element 3, thus reducing the thickness of the lamp 1.

Preferably, the lamp 1 also comprises a base 13, interposed between the plate (or the plates) 8 and the mounting surface "A" and connectable to both.

The base 13 defines a covering element 3 support surface "B" which is preferably parallel to the mounting surface "A" of the lamp 1, but which, in some embodiments, might be inclined at a different angle.

Thus, the base 13 is preferably a flat strip (of metal/polymer or rubber) having connecting portions 13*a* which can be associated with the covering element 3.

Preferably, the base 13 is substantially shaped to match the perimeter of the covering element 3 and has a doubled-up outer perimeter border 13*b* for reinforcing its profile and protecting the lamp support.

In other words, the base 13 comprises a central plate 13*c* and one or more doubled-up outer perimeter borders 13*b* extending upwards from the central plate 13*c*.

in the embodiment illustrated, the base 13 is provided with at least one locking pin 14 protruding transversely to the support surface "B" (that is, to the central plate 13*c*) and inserted in (coupled with) a respective housing made in the covering element 3.

Advantageously, the pin 14 mechanically stops (with a physical constraint) the relative sliding between the covering element 3 and the base 13, thereby increasing the shear strength of the lamp 1.

Shear stress is due mainly to the fact that the lamp 1 protrudes, albeit to a limited extent, from the mounting surface (or installation surface) "A", forming a small step which is subjected to shear when the wheels of vehicles/aircraft pass over it Preferably, the base 13 is connected to the junction plate 8 by at least one of the fastening members 11.

Hence, the connecting portions 13*a* of the base 13 are defined by openings which can be engaged with the screws 11*a* or by screws which can be engaged with the nuts inserted in the housings 15 (defined by the through holes 12 and by the plate 8).

In other words, the base 13 has a plurality of openings which are aligned with the openings 8*b* of the plates 8 to allow the fastening member 11 to be inserted.

Advantageously, that way, the lighting element 1*a* (made up of the covering element 3 integrated with the lighting unit 2 and with the plates 8) can be mounted to the base and can, if necessary, be quickly substituted during maintenance operations.

The base 1 an also be connected to the mounting surface by suitable fastening means 17.

In this regard, the lamp 1 comprises a tubular element 16 (or cup) extending transversely to the base 13 (and thus to the support surface "B") to define a conduit 16*a* for the passage of the electrical wiring (connector) between the circuit 5 and a power source.

Thus, the central plate 13*c* is provided with an aperture 13*d* of a size such as to allow positioning of the tubular element 16.

The tubular element 16 is rigidly connected to the central plate 13*c* of the base 13 (in such a way as to pass through it from side to side) by reversible connecting means such as, for example, screws, bolts or the like.

In this regard, it should be noted that the base or the tubular element (at its side walls) comprises a plurality of threaded holes for receiving the fastening members 11 (more specifically, the screws 11*a*).

Alternatively, the base 43 and/or the tubular element 16 comprises at least one small threaded cylinder 16*b* for receiving a corresponding fastening member 11 designed to engage it.

Figure 9:
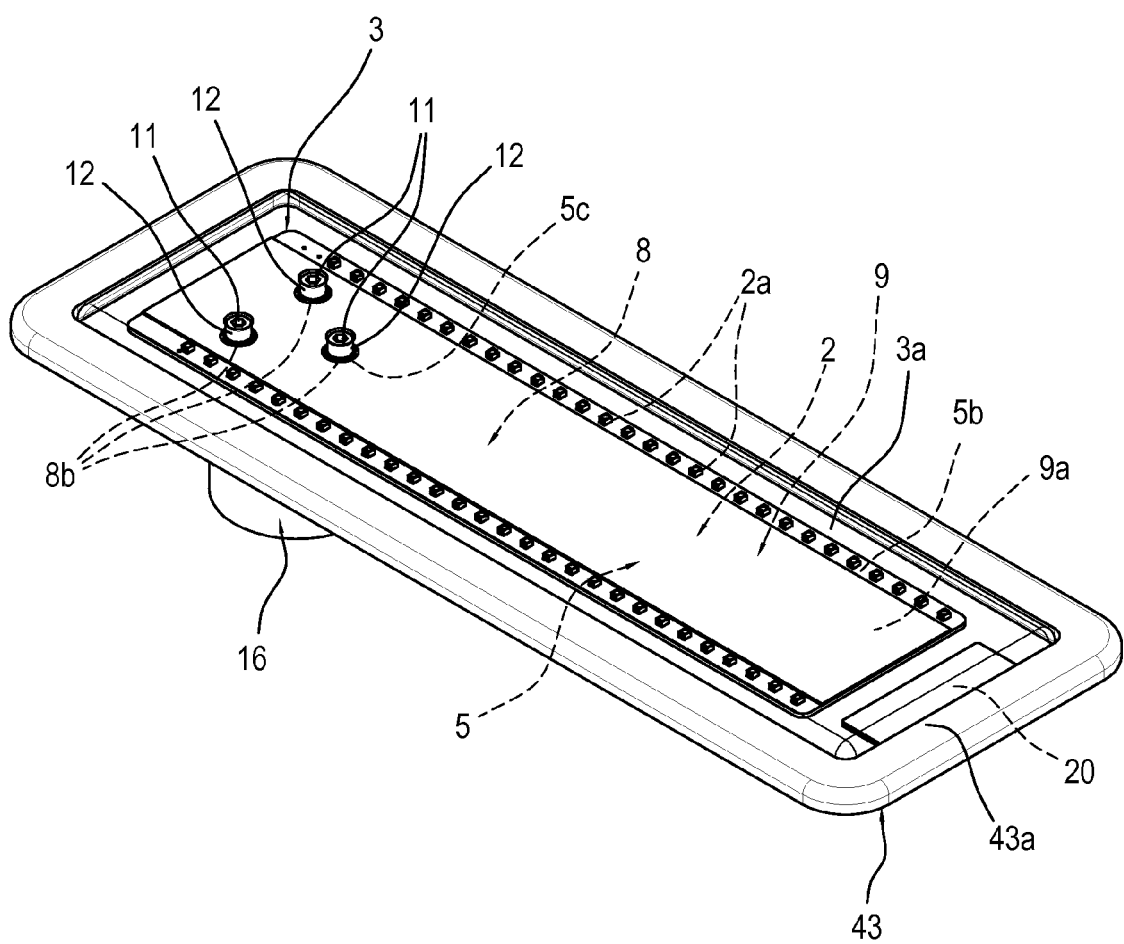

With reference to FIGS. 9-9*b*, the tubular element 16 is rigidly connected to the base 13 by welding.

Preferably, there is also a gasket 18 pressed around the connector in order to seal it.

In a preferred embodiment, the gasket 18 is made of the same sealing material as that used to make the sealing layer for the circuit 5.

Further, the tubular element 16 is rigidly connectable to the mounting surface "A" (in particular to the deck of a ship) either reversibly or irreversibly.

In a first embodiment, the tubular element 16 is welded to the mounting surface "A" (that is, to the deck).

In a second embodiment, the tubular element 16 is externally threaded so that it can be engaged with a matching cavity made in the mounting surface "A" (that is, in the deck).

Preferably, in this embodiment, the tubular element 16 is tightened to the mounting surface (deck) by a suitable threaded nut (not illustrated) coupled with the tubular element 16.

In this case, between the nut and the deck there is a gasket (O-ring) to prevent the passage of water from the deck. The gasket is pressed by the nut.

Obviously, all that refers to the deck of a ship might equally apply to any other installation/mounting surface of the lamp 1.

With reference to FIGS. 9-9*b*, the retaining means 9 are defined by a layer of adhesive material 9*a* interposed between the junction piece 8 and the second face 3*b* of the covering element 3. Also, in that case, the retaining means 9 are defined by a layer of sealing material 21 spread on one side 8*c* of the junction piece 8 directed towards the outside of the covering element 3.

Thus, the junction piece 8 is also sealed to the covering element 3.

Further, similarly to what is described above, the lighting unit 2 is sealed to the second face 3*b* of the covering element 3 by the layer of sealing material 21 spread on one side 2*b* of the lighting unit 2 directed towards the outside of the covering element 3, in such a way as to keep the lamp tightly sealed.

Thus, both the junction piece 8 and the lighting unit 2 are sealed to the covering element 3 by a layer of sealing material 21 on the outside of them.

In other words, the junction piece 8 and the lighting unit 2 are interposed between the covering element 3 and the layer of sealing material 21.

Further, the junction piece 8 is integrated with the lighting unit 2, both defined by the printed circuit 5, which is provided with a lighting portion 5*b* comprising the plurality of lighting elements 2a and the connecting portion 5c engageable with the mounting surface "A" to fix the position of the lamp 1.

Thus, the printed circuit 5 is fixed to the covering element 3 (more specifically to its second face 3b) by the layer of adhesive material 9 and sealed thereto by the layer of sealing material 21

In detail, the printed circuit 5 has a first face 5a directed towards the second face 3b of the covering element 3 and connected thereto by the layer of adhesive material 9a. The circuit 5 also has a second face 5d (corresponding to the exposed side), opposite to the first face 5a and covered with the sealing material 21 so as to keep the lamp 1 tightly sealed.

Alternatively, the printed circuit 5 might be connected and sealed to the covering element 3 only by the layer of sealing material (external).

Preferably, the lighting portion 5b is peripheral, whilst the connecting portion Sc is central (or internal).

In this case, too, the connecting portion 8a of the junction piece 8 comprises at least one abutment web 10 which is engageable with a fastening member 11 to anchor the lamp to the mounting surface "A".

Also, the covering element 3 has a plurality of through holes 12 in it, each shaped to receive a fastening member 11 (preferably, as mentioned above, a screw). Similarly to what is stated above, the connecting portion 8a of the junction piece 8 has an opening 8b aligned with, and smaller in extension than, each of the through holes 12 in such a way as to define the abutment web 10 for the fastening member 11 inserted in the through hole 12.

Preferably, each through hole is spot faced at the top of it so that a portion of it 12a (proximal to the first face 3a) is larger in diameter, and a portion of it 12b (distal from the first face 3a) is smaller in diameter, and between them they define a shoulder.

In light of this, each fastening member 11 preferably has a head with two undercuts 11b 11c, which abut against the shoulder 12c and the abutment web 10, respectively.

In other words, the head of each fastening member 11 (that is, screw) has two annular portions whose connecting portions define respective undercuts 11a, 11b used for fastening purposes.

Advantageously, that way, besides fastening the junction piece 8 to the base 43, the fastening member 11 also increases the packing effect between the covering element 3 and the selfsame junction piece 8 (that is, the printed circuit 5).

In the embodiment illustrated, the covering element 3 has a plurality of holes 12 located at only one half-part of the lamp.

Indeed, in this embodiment, the lamp 1 comprises at least one tongue 20 protruding laterally from the covering element 3 (on the other half-part) and irremovably connected thereto.

More specifically, the tongue 20 is defined by a thin metal plate interposed between the sealing material and the covering element 3 and protruding laterally substantially parallel to the mounting surface "A".

Alternatively, the tongue might also consist of a protuberance of the covering element 3.

In this regard, the base 43 has at least one peripheral shoulder 43a provided with a respective peripheral groove which is engageable with the tongue 20 to fasten the base 43 to the covering element 3 in conjunction with the fastening member 11

Advantageously, that way, installing and fastening the lamp is quick and easy because it is sufficient to slide the tongue 20 into the groove 44 and tighten the fastening members 11 (screws) into the respective half-part.

It should be noted that what is described in connection with the embodiments illustrated in FIGS. 1 to 5, where applicable and not in contradiction, also applies to the embodiment just described, illustrated in FIGS. 9, 9a, 9b.

In alternative embodiments, the base has different forms.

In a first alternative embodiment (FIG. 6), the base 23 is a block (made preferably of rubber) provided with at least one central compartment 23b, and where the central plate 23a defines a support plane above the selfsame compartment 23b.

Preferably, the central plate 23a is equipped with at least one slot 23c defining an aperture through which the support surface "B" can pass to allow the passage of the electrical wiring.

The receiving compartment which, in use, lies under the lighting element 1a, is shaped in such a way as to accommodate the electrical wiring box.

It should be noted that in this embodiment, it might not be necessary to make holes in the mounting surface "A" for the passage of wiring. In the case of wiring under the surface, the hole to be made is limited to that strictly necessary for the passage of the wiring It should be noted that the base 23 might be provided with a peripheral groove (not illustrated) which is engageable with the tongue 20 of the lamp illustrated in FIGS. 9-9b, in such a way as to fasten the base 23 to the covering element 3 in conjunction with the fastening member 11.

In a second alternative embodiment, the base 33 is provided with two lateral longitudinal compartments 33a for the wiring and with a box 33b for the wiring connections Preferably, the base 33 houses two lighting elements 3

In this embodiment, the power supply wiring does not pass through the support surface "B" of the base 33, but exit the covering element 3 through the lateral edge to connect to the aforementioned box.

Thus, the base 33 defines a linear rail where the wiring connects along the surface the lighting elements 1a arranged in series.

To minimize the need for holes on the surface, the holes 12 and the fastening members 11 secure the element 3 to the mounting surface "A" and, indirectly, also to the support surface "B" (that is, the central plate 33a of the base 33)

Advantageously, this embodiment is not invasive on the mounting surface and lamp installation is therefore less critical for the mounting structure (for example, the deck of a ship).

it should be noted that in this case, too, the base 33 might be provided with a peripheral groove (not illustrated) which is engageable with the tongue 20 of the lamp illustrated in FIGS. 9-9b, in such a way as to fasten the base 33 to the covering element 3 in conjunction with the fastening member 11.

The invention achieves the proposed aims and brings important advantages.

Indeed, the presence of a substantially full and slotted covering element to house the lighting unit makes it possible to obtain an extremely low profile although the lamp is entirely above the mounting surface.

What is more, the limited thickness makes it possible to obtain a mechanically flexible lamp which can adapt to deformation of the deck without high stresses.

Further, the connection to the mounting surface through the tubular element or the like does not require large openings to be made in the mounting surface but only one or more holes to accommodate the cup.

The use of sealing material, in particular in the embodiment where the lighting unit is embedded, allows the lighting element to be sealed without openings and gaskets, while at the same time allowing quick and easy substitution.

Advantageously, the presence of a lighting element which is removably connected to the base enables the lamp to be substituted without opening it (and thus without exposing the LEDs).

Thanks to the absence of opaque elements round the edge of the covering element, the lamp emits sidelight along the mounting surface and this, in these applications, is of considerable importance.

What is claimed is:

1. A surface mounting lamp, comprising:
    a covering element made of a transparent material and having a first face, which in use is directed outwards away from a mounting surface for the lamp, and a second face opposite the first face and including a socket;
    a sealed lighting unit connected to the covering element, facing the inside of the socket and equipped with a plurality of lighting elements, each housed at least partly in the socket;
    a junction piece connected to the covering element and equipped with a connecting portion which can be connected to the mounting surface to fix a position of the lamp;
    a retaining mechanism interposed between the junction piece and the second face of the covering element to connect the covering element to the junction piece, wherein the retaining mechanism includes a layer of adhesive material interposed between the junction piece and the second face of the covering element;
    a base including a support surface for the covering element; the base being connectable rigidly to the mounting surface;
    a fastening member for connecting the covering element to the base;
    wherein the covering element includes a through hole larger than the fastening member for receiving the fastening member, the fastening member engaging the connecting portion such that the fastening member provides a clamping force to the covering element with respect to the base only through the junction piece.

2. The lamp according to claim 1, and further comprising a layer of sealing material spread on a side of the lighting unit facing away from the covering element to seal the lighting unit to the covering element.

3. The lamp according to claim 2, wherein the lighting unit and the junction piece are defined by a printed circuit which includes a lighting portion, comprising the plurality of lighting elements, and the connecting portion.

4. The lamp according to claim 3, wherein the printed circuit includes a first face directed towards the second face of the covering element and connected thereto by the layer of adhesive material, and a second face opposite the first face and covered with the sealing material to keep the lamp tightly sealed.

5. The lamp according to claim 1, wherein the connecting portion of the junction piece comprises at least one abutment web, and the fastening member engages the abutment web to anchor the lamp to the mounting surface.

6. The lamp according to claim 5, wherein the covering element includes a plurality of through holes each shaped to allow insertion of a plurality, of fastening members; the connecting portion of the junction piece including a plurality of openings each aligned with a respective through hole and smaller in extension than the respective through hole, thus defining the abutment web for the fastening members inserted in the through holes.

7. The lamp according to claim 5, wherein each fastening member includes a screw or nut which can be tightened in abutment against the abutment web of the junction piece.

8. The lamp according to claim 1, wherein the covering element and the lighting unit are a molded unit with the lighting unit completely embedded in the covering element such that the elements are in direct engagement with the covering element without air volume between the covering element and the lighting elements.

9. The lamp according to claim 1, and further comprising a tongue protruding laterally from the covering element and irremovably connected thereto; the base having a peripheral shoulder including a respective peripheral groove which is engageable with the tongue to fasten the base to the covering element in conjunction with the fastening member.

10. The lamp according to claim 1, and further comprising a tubular element connected rigidly to the base and extending transversely thereto to form a conduit for the passage of electrical wiring between the lighting unit and a power source.

11. The lamp according to claim 10, wherein at least one chosen from the base and the tubular element comprises a threaded cylinder for receiving a corresponding fastening member configured to engage the threaded cylinder.

12. The lamp according claim 1, wherein the lighting elements are LEDS.

13. The lamp according to claim 2, wherein the covering element and the lighting unit are a molded unit with the lighting unit completely embedded in the covering element such that the lighting elements are in direct engagement with the covering element without air volume between the covering element and the lighting elements.

14. The lamp according claim 1, wherein the fastening element is positioned entirely below the first face of the covering element and the first face is substantially flat.

15. The lamp according claim 1, wherein the junction piece is separate from the lighting unit and the lighting unit is sealed to the covering element to be isolated from the junction piece.

16. A surface mounting lamp, comprising:
    a covering element made of a transparent material and having a first face, which in use is directed outwards away from a mounting surface for the lamp, and a second face opposite the first face and including a socket;
    a sealed lighting unit connected to the covering element, facing the inside of the socket and equipped with a plurality of lighting elements, each housed at least partly in the socket;
    a junction piece connected to the covering element and equipped with a connecting portion which can be connected to the mounting surface to fix a position of the lamp;
    a retaining mechanism interposed between the junction piece and the second face of the covering element to connect the covering element to the junction piece, wherein the retaining mechanism includes a layer of adhesive material interposed between the junction piece and the second face of the covering element;
    wherein the covering element and the lighting unit are a molded unit with the lighting unit completely embedded in the covering element such that the lighting elements are in direct engagement with the covering element without air volume between the covering element and the lighting elements.

17. A surface mounting lamp, comprising:
    a covering element made of a transparent material and having a first face, which in use is directed outwards away from a mounting surface for the lamp, and a second face opposite the first face and including a socket;

a sealed lighting unit connected to the covering element, facing the inside of the socket and equipped with a plurality of lighting elements, each housed at least partly in the socket;

a junction piece connected to the covering element and equipped with a connecting portion which can be connected to the mounting surface to fix a position of the lamp;

a retaining mechanism interposed between the junction piece and the second face of the covering element to connect the covering element to the junction piece, wherein the retaining mechanism includes a layer of adhesive material interposed between the junction piece and the second face of the covering element;

a layer of sealing material spread on a side of the lighting unit facing away from the covering element to seal the lighting unit to the covering element.

* * * * *